United States Patent [19]

Meggs et al.

[11] Patent Number: 4,521,835
[45] Date of Patent: Jun. 4, 1985

[54] FLEXIBLE ELONGATED LIGHTING SYSTEM

[75] Inventors: Daniel H. Meggs, La Mirada; Herbert G. Gross, Santa Ana; John T. Greenslade, El Toro, all of Calif.

[73] Assignee: Gulf & Western, Southfield, Mich.

[21] Appl. No.: 495,263

[22] Filed: May 17, 1983

[51] Int. Cl.³ .................. F21V 21/00; F21V 5/02; B64D 47/02

[52] U.S. Cl. .................. 362/183; 362/62; 362/184; 362/191; 362/216; 362/217; 362/230; 362/235; 362/251; 362/311; 362/320; 362/339; 362/800

[58] Field of Search .................. 362/20, 62, 80, 147, 362/157, 158, 183, 184, 186, 189, 190, 191, 192, 216, 217, 224, 225, 227, 230, 231, 234, 235, 236, 237, 240, 241, 244, 246, 248, 249, 251, 311, 320, 339, 800; 340/815.03, 815.16, 782; 313/499, 500

[56] References Cited

U.S. PATENT DOCUMENTS

| | | | |
|---|---|---|---|
| 2,703,398 | 3/1955 | Harrington et al. | 362/249 X |
| 3,275,818 | 9/1966 | Campbell | 362/249 |
| 3,411,131 | 11/1968 | Hewes | 340/945 |
| 3,428,941 | 1/1969 | Hewes | 340/981 |
| 3,551,723 | 12/1970 | Van Groningen | 362/227 X |
| 3,684,882 | 8/1972 | Mininno et al. | 362/184 |
| 3,755,663 | 8/1973 | George | 362/249 |
| 3,994,049 | 11/1976 | Johansen et al. | 244/151 A X |
| 3,995,152 | 11/1976 | Chao et al. | 362/249 |
| 4,012,671 | 3/1977 | Vaice | 102/213 X |
| 4,107,767 | 8/1978 | Anquetin | 362/236 |
| 4,173,035 | 10/1979 | Hoyt | 362/249 |
| 4,177,503 | 12/1979 | Anquetin | 362/249 X |
| 4,195,330 | 3/1980 | Sauage | 362/800 X |
| 4,263,640 | 4/1981 | Altman | 362/227 X |
| 4,271,458 | 6/1981 | George, Jr. | 362/236 |
| 4,365,232 | 12/1982 | Miller | 340/945 |
| 4,376,966 | 3/1983 | Tieszen | 362/249 |

FOREIGN PATENT DOCUMENTS 2173329 12/1973 France .

OTHER PUBLICATIONS

Lite Lab Corporation Brochure.

Primary Examiner—David H. Brown
Assistant Examiner—John E. Griffiths
Attorney, Agent, or Firm—Jackson, Jones & Price

[57] ABSTRACT

A lightweight emergency lighting system capable of arrangement into various subjective configurations is provided. A housing member supports a plurality of individual lighting elements mounted on a common semi-rigid bus bar. The upper configuration of the housing members is capable of a directional transmission of light towards a predetermined field angle, while the lower configuration is adaptable for mounting the lighting elements. The upper housing member can have an interior surface of a prismatic configuration to provide a refraction and reflection of light in combination with the exterior surface. The lighting elements, such as L.E.D.'s, can be excited through a pulsing circuit to maximize the light output while conserving power from an auxiliary battery source.

17 Claims, 9 Drawing Figures

FLEXIBLE ELONGATED LIGHTING SYSTEM

BACKGROUND OF THE INVENTION

1. Field of the Invention

The present invention is directed to a lightweight flexible elongated lighting system, and more particularly to a lighting system which is adapted for activation in emergency situations to provide occupants with an egress from a structure, such as an aircraft.

2. Description of the Prior Art

Numerous examples of elongated lighting systems for indicating paths of egress and also for providing residential and occupational illumination have existed in the prior art.

Additionally, emergency lighting systems that can be autonomously activated, apart from a principal source of conventional power, are frequently utilized and sometimes even required by building codes and other regulations. In the military, emergency lighting systems have been proposed, such as disclosed in U.S. Pat. No. 4,365,232, to mark exits or escape hatches, e.g. on aircraft. A particular problem has occurred with helicopters, especially on flights over water, wherein due to their high center of gravity, the helicopter body will invert after a crash. Upon the inversion of the helicopter and in view of the consequential confusion produced on its occupants, it becomes extremely difficult to leave a sinking helicopter due to darkness or low visibility in water and the inverted state of the craft. If the occupants do not evacuate immediately from the helicopter, drowning will result. Other examples of emergency lighting systems in the environment of military aircraft are disclosed in U.S. Pat. No. 3,411,131, and U.S. Pat. No. 3,428,941.

The prior art has also suggested flexible elongated strip light systems, for example, in U.S. Pat. No. 4,376,966, U.S. Pat. No. 4,271,458, and U.S. Pat. No. 4,107,767. The Litelab Corporation of New York, N.Y., provides a low voltage tube light under the trademark "Xanadu". Various configurations of tube lights are offered from either a shatterproof rigid polycarbonate or a cylindrical flexible polyvinylchloride material.

There is a present need in the prior art to provide a flexible elongated lighting system capable of an efficient and optimum use of the light generated, and more particularly to provide an automatic emergency egress lighting system which can accomodate a diversity of sizes and shapes of points of egress, such as the escape doors and hatches on military helicopters.

SUMMARY OF THE INVENTION

The present invention relates to an elongated lighting system which can be used as a lightweight emergency lighting system on aircraft, such as helicopters, to identify an exit. This lighting system comprises an elongated flexible waterproof housing member that is capable of a directional transmission of light towards an optimum predetermined field angle. The housing member is transparent and can be bent to define a subjective outline of an exit. A plurality of individual lighting elements are electrically mounted in parallel in the housing member and are spaced along a substantial portion of its length. The housing member is preferably provided with a variable thickness upper portion to optimize both refraction and reflection of the generated light and with a lower portion to facilitate the mounting and positioning of the lighting elements along the length of the housing member and also to a support structure. The lighting elements, in a preferred embodiment, can comprise light emitting diodes which can be driven by pulsed excitation of an appropriate width and peak to provide an optimum level of light without risking damage to the L.E.D.'s while conserving an auxiliary power source. While the lighting system can be energized from conventional sources of power, it is contemplated that an autonomous battery system will be provided to be activated in the case of an emergency. Activation can occur through a manual switch, an automatic disruption of the conventional power source, or upon a sensing of an emergency situation, such as the presence of water.

The preferred embodiment disclosed herein utilizes an extruded lightweight flexible transparent plastic resin for the housing member which is extruded to provide interior and exterior surfaces for reflection and refraction of the generated light to maximize the illumination perceivable by the occupants in emergency situations. Such emergency situations can constitute an environment under water or in the presence of smoke and fire.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the optical and electrical field to make and use the invention and sets forth the best modes contemplated by the inventor of carrying out his invention. Various modifications, however, will remain readily apparent to those skilled in these arts, since the generic principles of the present invention have been defined herein specifically to provide a relatively economical and easily manufactured elongated lighting system particularly adapted for use as an emergency egress lighting system.

Figure 1:
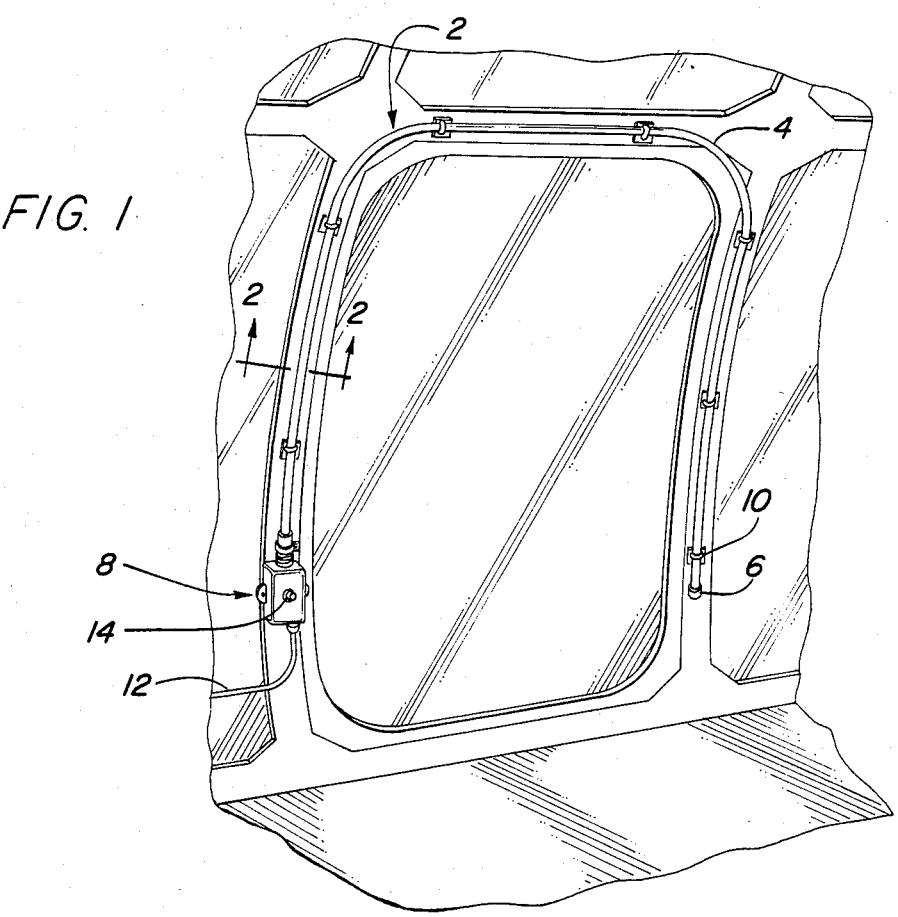
FIG. 1 is an illustrative perspective view of an emergency lighting system mounted about an egress point of an aircraft.

Referring to FIG. 1, the interior of a vehicle, e.g., a helicopter is partially shown, and more particularly an egress or escape door is illustrated. Mounted about the upper sides and top of the door is the emergency lighting system 2 of the present invention in an inverted U configuration to provide distinct orientation to an observer. The lighting system 2 includes an elongated flexible waterproof housing member 4 which is sealed at one end by a cap 6 and both sealed and electrically connected to a control unit 8 at the other end. The housing member 4 can be appropriately mounted to the walls of the helicopter by a plurality of mounting clips 10.

The cap 6 can include an interconnection adapter which has been welded to the housing member 4 and which in turn is closed by a plug assembly, usually incorporating a retainer for anchoring the contact strip of the lighting elements to be described subsequently. Specifically, the end cap, although not shown in detail, provides a waterproof connection and an anchor point (not shown) for mounting the contact strip of lighting elements to be described subsequently. Specifically, the cap 6, although not shown in detail, provides a waterproof closure and anchor point for the contact strip.

The control unit 8 serves the function of providing a waterproof housing for a plurality of batteries, such as rechargeable nickel-cadmium batteries, and also for mounting a printed circuit board (not shown) which interconnects with a conventional source of power from the vehicle via power conduit line 12. A manual test switch 14 can be subjectively positioned on the control unit 8 to determine the operability of the emergency lighting system 2.

While not shown in FIG. 1, a disable switch 16 can be mounted within the interior of the control unit 8 for deactivating the emergency lighting system 2, for example, if the escape door is blocked. As with the end cap 6, the connections to control unit 8 by the housing member 4 and the power line 12 are made with waterproof seals Referring to FIG. 2, a cross sectional view taken transverse to the longitudinal axis of the housing member 4, is provided. The housing member 4 can be formed from an extruded polyvinyl material, such as TYGON, a plastic material known in the prior art and sold by Norton Products Co. The specific configuration of the housing member is designed to provide an optimum utilization of the generated light from a plurality of lighting elements 18 which are spaced along the length of the housing member 4. In the preferred embodiment, the lighting elements 18 can be light emitting diodes (L.E.D.) which are capable of instantaneous activation in an emergency condition. The configuration of the housing member 4 is also acceptable for an operative working with other forms of illumination, such as incandescent lights, but the description hereinafter will be directed to the utilization of light emitting diodes.

The bottom portion of the lower base portion of the light housing member 4 is provided with spacing flanges 24 and 26 for interfacing with the mounting brackets 10. The flanges also insure an optical alignment of the upper housing portion of the housing member 4 relative to the mounting surface. As described earlier, the mounting brackets 10 are utilized for the appropriate securement of the lighting housing member 4 to the vehicle structure. Appropriate metal brackets or plastic tie strips could be utilized to provide either a permanent or removeable mounting to the support structure, such as the bulkhead of the helicopter.

The housing member 4 can also provide a dual function in its interface with the lighting elements 18. The prime function is its ability to distribute the light from the lighting element 18 in an optimally efficient manner. In this regard, the structure disclosed in FIGS. 2 and 3 and also FIGS. 5 through 7 define various configurations for the distribution of light. Preferably the light will be distributed over a field angle of at least ±65 degrees about the normal to the axis of the light element 18, as viewed in FIG. 2. The design intent is to utilize all the light available, so that an auxiliary power source can be optimized in the terms of weight. Thus, to achieve the advantages of the present invention, it is important for the upper light transmission portion of the housing member 4 to have a configuration which directs the light from the lighting elements 18 through an upper light emitting surface to a predetermined field angle that will insure viewing without wasting any of the power and light which is generated.

Figure 2:
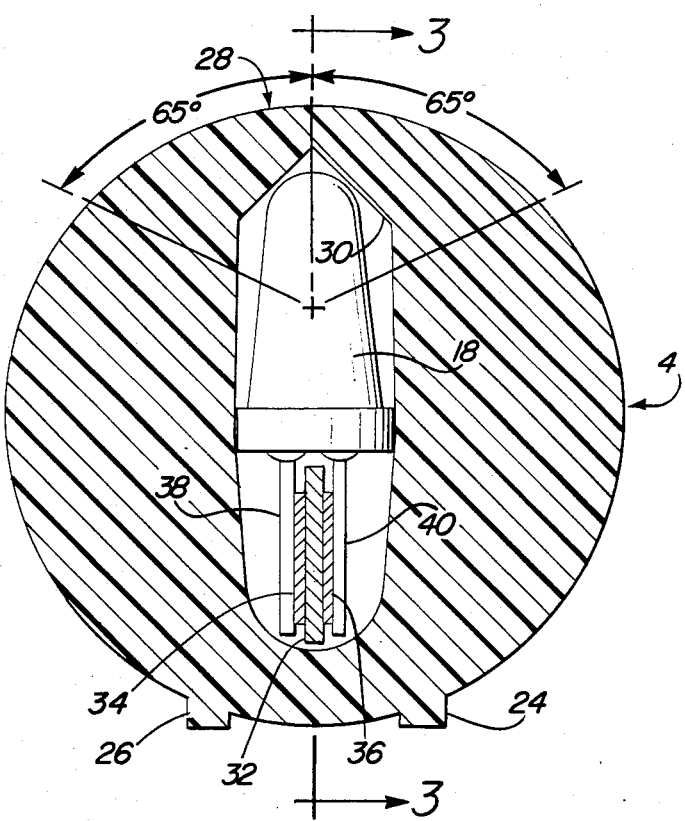
FIG. 2 is a side cross sectional view of the light housing member and light emitting diodes transverse to the longitudinal axis.
Figure 3:
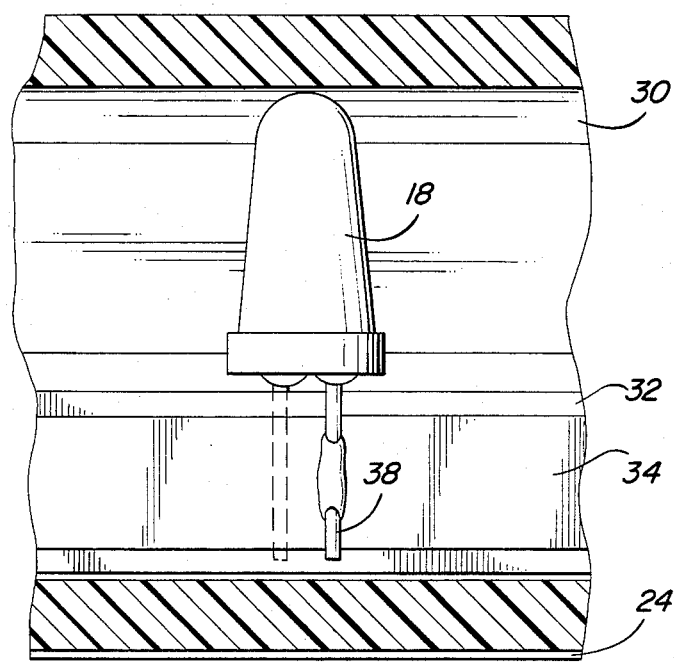
FIG. 3 is a side cross sectional view taken along line 3—3 of FIG. 2.

The cross sectional view of FIG. 2 taken transverse to the longitudinal axis of the housing member 4 and the cross sectional view of FIG. 3 taken along the longitudinal axis of the housing member 4 discloses a spherical outer surface 28 and two internal planar surface 30, effectively producing double prisms within the housing wall. The prismatic internal surface 30 comprises two planar facets forming side corner edges and a central apex point that extend the entire length of the housing member 4. Preferably, this housing configuration and the other embodiments will provide a viewing angle of at least 130 degrees or greater to the occupants. Thus, a person adjacent to a wall of the structure and at a distance from the egress opening will still be able to perceive the emergency light under adverse conditions. As can be appreciated, the particular light distribution will be a function of the light emitting characteristics of the lighting element 18 and the reflective and refractive characteristics of the internal and external surfaces. Modifications in the light housing envelope to enhance these characteristics for a specific lighting element is possible.

The lower base portion of the housing member 4 serves a secondary function of providing a frictional mounting for the lighting elements 18. The lighting elements 18 are spaced along the length of the housing member 4, e.g., approximately twelve or more L.E.D.'s can be mounted per foot of housing member 4. The number of L.E.D.'s, along with the manner of energizing them, to be described subsequently, will affect the level of illumination. Each of the L.E.D. elements 18 will be connected in parallel to the power source, e.g., a battery pack acting as a dedicated power source and contained in the control unit 8. The configuration of the lower housing portion of the housing member 4 is designed to accomodate a double bus mounting of a flexible plastic insulating strip 32 which supports on either side, a flat copper conducting ribbon 34 and 36 bonded to the insulating strip 32 to provide electrical contacts. The respective terminal pins 38 and 40 of the L.E.D.'s will straddle the bus strip and will be lap soldered to the conductive ribbons 34 and 36, respectively.

This particular arrangement is designed for optimum flexibility along the plane of bending during installation. The plastic strip 32 is relatively rigid along a plane parallel to the light element axis and will cooperate in maintaining the L.E.D. configuration in a correct orientation in the light housing member 4. The L.E.D.'s can be of an appropriate color, such as green, that can be subjectively determined for the particular emergency situation and environment that the present invention will address. The L.E.D's offer a higher efficiency in the conversion of input power, e.g., green light relative to an incandescent light source with a filter. It was found that L.E.D.'s are unique in that a relatively narrow spectral band of green light is emitted with a peak wavelength in the green region having a bandwidth of about twenty to thirty-five nanometers. The advantage of green light is that it has a minimal attenuation when traversing through water. The contemplated L.E.D.'s have an operating voltage of two volts with a peak emission wavelength of 565 nanometers and a spectral bandwidth of approximately thirty-five nanometers. The full emission cone angle is approximately 10 degrees, and the particular design of the upper lighting housing member 4 is suggested for optimizing the disbursement of this light over the predetermined field angle that is desired.

Figure 4:
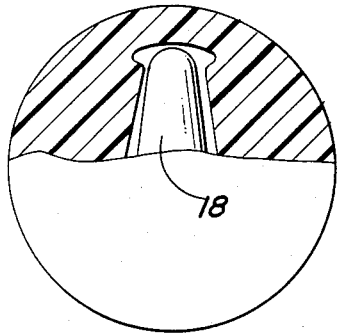
FIG. 4 is a cross sectional view of a second embodiment of the light housing of the present invention.
Figure 5:
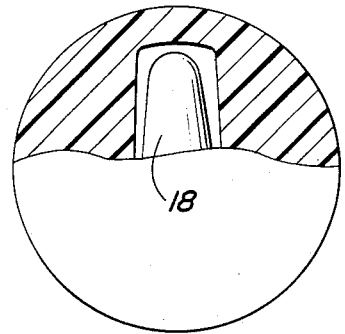
FIG. 5 is a cross sectional view of a third embodiment of the light housing of the present invention.
Figure 6:
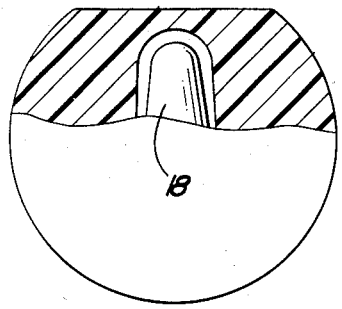
FIG. 6 is a cross sectional view of a fourth embodiment of the light housing of the present invention.
Figure 7:
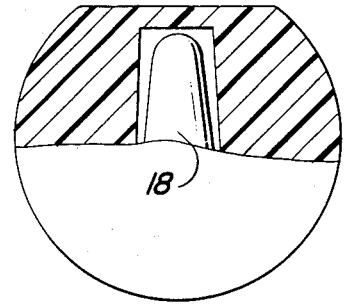
FIG. 7 is a cross sectional view of a fifth embodiment of the light housing of the present invention.

The respective embodiments for the light housing member 4 suggested in FIGS. 4 through 7 also disclose a flat external surface which could have a rough configuration for disbursement or scattering of the egressing light. In FIGS. 4 and 5, a curvilinear configuration is provided for the interior of the housing member 4 with an exterior spherical surface. In FIG. 6, a flat external surface is provided in conjunction with an internal hemispherical surface. In FIG. 7, a flat exterior surface is provided with an internal surface that includes a pair of corner edges extending along the axial length of the housing member 4. The corner edges are also a characteristic of the embodiment disclosed in FIGS. 2 and 3. FIG. 7 discloses a cross sectional square configuration for its interior surface in combination with a flat exterior surface. Each of the housing members 4 have a tubular or substantially tubular configuration, depending upon whether a flat exterior surface is provided. In the preferred embodiment the interior configuration of the housing member 4 provides for a frictional holding of the lighting elements 18 in an operative position. However, an advantage of the semi-rigid plastic support strip 32 permits the advantages of the present invention to be utilized without resorting to a frictional holding of the lighting elements 18.

The choice of L.E.D.'s as the preferred lighting elements provides a limitation in the intensity of light emitted. However, a particular advantage is achieved by resorting to a pulsing power source in that an optimization of the intensity of light from the L.E.D.'s can be achieved, and the utilization of the average power from a battery supply can be extended.

The human eye, from the standpoint of temporal response and sensitivity characteristics, can perceive, particularly in a dark environment, a pulsed excitation as, in fact, a steady light source. Furthermore, by selecting an appropriate pulsing cycle, it is possible that the source can be more visually noticeable and discriminated through any highly scattering medium, such as fog, smoke, turbid water, etc. than a light source that is constantly on and is subject to a persisting scattering of light. By pulsing the L.E.D.'s, the intensity of the emitted light can be increased by the use of a higher current level per pulse.

Figure 8:
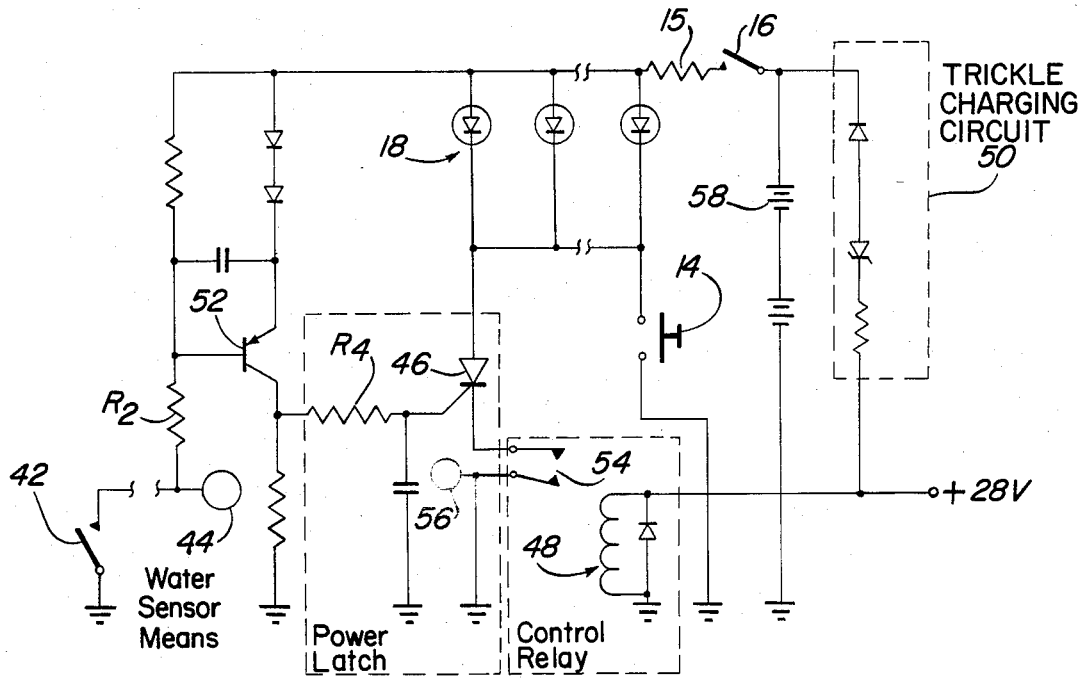
FIG. 8 is a schematic illustration of an electric circuit of the present invention.

Referring to FIG. 8, an electronic circuit is disclosed which is provided on the printed circuit board mounted in the control unit 8. The electronic circuit is designed to activate the emergency lighting system 2 of the present invention under certain conditions and, with reference to FIG. 9, in the preferred embodiment, a pulsing circuit will be provided for activating the L.E.D. elements 18. As can be readily appreciated, variations of these circuits are possible to achieve the same purpose of the present invention.

Basically, the circuit comprises a control switch function that can include a pilot arming switch 42 and, optionally, a trigger control switch 44, such as a water activated sensor switch of the type disclosed in U.S. Pat. No. 3,994,049 and U.S. Pat. No. 4,012,671 which are incorporated herein by reference. The arming switch circuit consists of a transistor and associated biasing components.

A power latch circuit consists of a silicon rectifier 46 and its biasing components which are normally opened by the activation of a control relay 48 that is powered by a conventional power source, such as an inboard electrical generator, e.g., a 28 volt D.C. source in a helicopter. As long as this 28 volt source is present, the control relay 48 will maintain the L.E.D.'s in an off condition. Also connected to the principal power source is a trickle charging circuit 50 to insure that the nickel-cadmium batteries 58 are maintained in a charged state.

In a power off condition, the arming switch 42 is usually open. When the aircraft is under power, a 28 volt direct current control signal maintains the control relay 48 in an open position. The pilot then can arm the emergency lights 18 by closing switch 42. Closing switch 42 provides a current path through resister R4 to supply base current to the transistor 52. Transistor 52 is then turned on, and a trigger current is supplied through resister R4 to the gate of the silicon rectifier 46. The SCR 46 appears as a closed switch but the light elements 18 will not come on because of the open circuit caused by the activated control relay 48 which opens the normally closed contacts 54. Switch 16 which is mounted within the control unit 8 is capable of deactivating the entire emergency lighting system 2, in case the exit or egress point is inoperative or blocked. A current limiting resistor 15 is connected between switch 16 and the lighting elements 18. Switch 14 is mounted with a waterproof seal in the control unit 8 and can be manually activated to bypass the open contacts 54 for testing the operativeness of the actual lighting elements 18. The trickle charging circuit 50 is continually activated to insure that the batteries 58 are constantly kept in a charged state for use in an emergency situation.

As can be appreciated, a large number of lighting elements 18 can be mounted in parallel depending on the illumination required, although only a few are disclosed in the circuit of FIG. 8.

Figure 9:
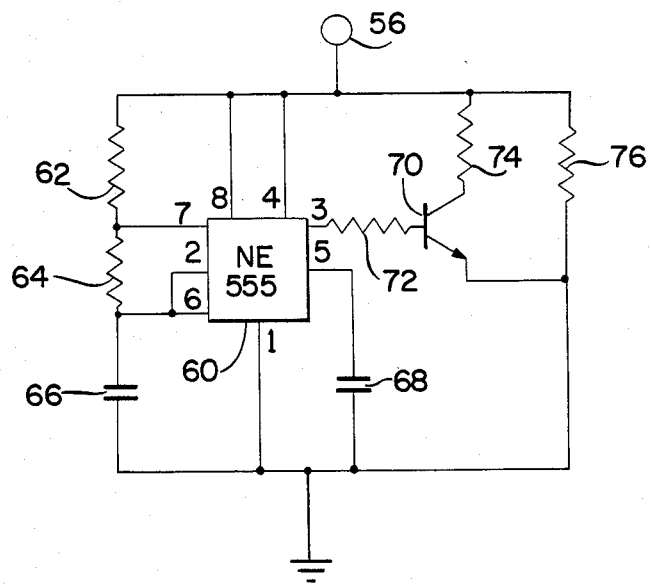
FIG. 9 is a schematic illustration of the pulsing circuitry of the present invention.

In an emergency and upon removal of the 28 volt line current which is carried to the control unit 8 by the power line 12, the control relay 48 will be deactivated, and the contacts will be closed, allowing the lighting elements 18 to be activated. In the preferred embodiment, a pulsing circuit, FIG. 9, is interposed between terminal 56 and ground and is mounted on the same printed circuit board as the primary control circuit for the light elements 18. This pulsing circuit causes the current flow to periodically alternate between a high and a low value.

This pulse excitation of the lighting elements 18, particularly when the lighting elements 18 are L.E.D.'s, provides two distinct advantages in the present invention. First, a maximum generation of light is capable from the L.E.D.'s, and, e.g., by selecting green L.E.D.'s, a maximum utilization of the efficiency is achieved in adverse or hostile conditions. Secondly, the pulsing of the L.E.D.'s specifically conserves the auxiliary and autonomous power supply available through the batteries 58 and thereby extends the active life of the emergency lighting system 2. As can be readily expected, it is highly desirable for the system to operate with a high degree of reliability for at least a sufficient amount of time to permit the occupants to leave the structure.

The pulsing circuit is based upon a commercially available programmable timing circuit 60 such as a circuit manufactured by Signetics Inc. under the designation NE555. Circuit 60 is connected in the astable or oscillating configuration. Pins 8 and 4 are connected directly to terminal 56. A resistor 62 is connected between pin 7 and terminal 56 with a second resistor being connected between pins 7 and pins 2 and 6. A capacitor 66 is also provided which is connected between pins 2 and 6 and ground. Pin 1 is connected directly to ground and pin 5 is connected to ground through a capacitor 68. Output pin 3 is connected to the base of a NPN transistor 70 by way of a resistor 72. The emitter of transistor 70 is connected directly to ground with the collector being connected to terminal 56 through a resistor 74. Finally, a resistor 76 is connected between terminal 56 and ground.

The output of circuit 60 at pin 3 alternates between a relatively low and high voltage. The ratio of the high voltage period to the low voltage period (duty cycle) and the repetition rate frequency of the circuit 60 output may be selected by varying the values of resistors 62 and 64 and capacitors 66 and 68. When the output on terminal 3 is low, transistor 70 is off. Accordingly, the effective impedance between terminal 56 and ground is the value of resistor 76 which is low in comparison to the value of resistor 62. When the output on terminal 3 is high, transistor 70 is turned on, thereby effectively placing resistor 74 in parallel with resistor 76. Resistor 74 is typically somewhat lower in value than resistor 76. Accordingly, the effective impedance between terminal 56 and ground is substantially reduced when transistor 70 is on.

The magnitude of the alternating high and low current flow through light elements 18 can be adjusted by varying the values of resistors 74 and 76. Resistor 76 can be a relatively high value so that the light elements are effectively turned off when transistor 70 is off, so long as the minimum SCR 46 holding current is maintained. Alternatively, resistor 76 can have a somewhat lower value so that the intensity of illumination of lighting elements 18 will modulate between a low and high value. A repetition rate approximately on the order of 125 cycles per second with a 25 percent high/low duty cycle has been found suitable for this application. Other frequencies and duty cycles can be achieved by varying the values of the appropriate components of the pulsing circuit, as previously noted.

In summation, the present invention provides a lightweight flexible light source that can be activated in an emergency situation. As can be readily appreciated, it is possrble to deviate from the above embodiments of the present invention and, as will be readily understood by those skilled in the art, the invention is capable of many modifications and improvements within the scope and spirit thereof. Accordingly, it will be understood that the invention is not to be limited by the specific embodiments but only by the scope and spirit of the appended claims.

We claim:

1. A non-land vehicles lightweight emergency lighting system, comprising:
   an extruded, elongated, approximately tubular, flexible waterproof housing member having a hollow interior with an upper light transmission portion of a cross-sectional variable thickness, the optical refraction characteristics of the upper light transmission portion providing a directional transmission of light towards a predetermined field angle extending traversely to a longitudinal axis of the housing member that is substantially less than 360°, and a lower mounting portion of a different configuration, the upper and lower portions extending substantially along the entire length of the housing member;
   a plurality of light-emitting diodes positioned within the hollow interior of the housing member on a plane intersecting the housing member longitudinal axis and the middle of the upper light transmission portion and spaced along the longitudinal axis of the housing member;
   an approximately flat bus strip mounting the light-emitting diodes along one edge and providing common electrical connections to each diode, the bus strip being laterally flexible perpendicular to the plane, the lower portion of the housing member supporting the bus strip so that the light-emitting surfaces of the diodes are operatively positioned adjacent the upper portion of the housing member to primarily distribute the light emitted from the diodes within the predetermined field angle, and
   means for providing a pulsed electrical power to illuminate the light-emitting diodes and providing a perceptively constant brightness to prolong the life of the power during an emergency.

2. The invention of claim 1 wherein the housing member is formed of a plastic resin material.

3. The invention of claim 1 wherein the upper light transmission portion of the housing member includes a prismatic configuration for directing light towards the predetermined field angle.

4. The invention of claim 1 wherein the housing member includes a flat exterior surface and a non-planar interior surface for directing light.

5. The invention of claim 1 wherein the housing member has an interior surface that forms a pointed groove along the axial length of the housing member.

6. The invention of claim 1 wherein the housing member has an interior surface that includes a pair of corner edges extending along the axial length of the housing member.

7. The invention of claim 1 wherein the housing member has an interior surface of a curvilinear configuration.

8. The invention of claim 1 further including mounting flanges integrally provided on the exterior of the housing member.

9. The invention of claim 1 wherein the housing member is extruded from a polyvinyl plastic material.

10. The invention of claim 1 wherein the housing member has an interior surface formed of planar facets.

11. The invention of claim 10 wherein the planar facets reflect and refract the incident light.

12. The invention of claim 1 wherein the means for providing a pulsed excitation of the lighting elements to conserve the power includes an autonomous dedicated power source.

13. The invention of claim 12 wherein the autonomous dedicated power source is at least one rechargeable battery.

14. The invention of claim 1 further including means for activating the lighting system in an emergency.

15. The invention of claim 14 wherein the means for activating includes a water sensor means for indicating contact with water.

16. The invention of claim 1 wherein the upper light transmission portion includes an elongated interior surface of at least a pair of planar facets to reflect and refract the incident light to the predetermined field angle.

17. The invention of claim 16 wherein the means for providing electrical power includes a pulsed excitation of the bus strip electrical connections for providing a simultaneous excitation of the light-emitting diodes to conserve the expenditure of electrical power.

* * * * *